(12) United States Patent
Reid

(10) Patent No.: US 11,117,812 B2
(45) Date of Patent: Sep. 14, 2021

(54) SYSTEM AND METHOD OF SOLIDS CONDITIONING IN A FILTRATION SYSTEM

(71) Applicant: Terence K. Reid, Poplar Grove, IL (US)

(72) Inventor: Terence K. Reid, Poplar Grove, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

(21) Appl. No.: 15/988,130

(22) Filed: May 24, 2018

(65) Prior Publication Data

US 2019/0359500 A1 Nov. 28, 2019

(51) Int. Cl.
*C02F 1/00* (2006.01)
*C02F 3/00* (2006.01)
*C02F 3/22* (2006.01)

(52) U.S. Cl.
CPC .............. *C02F 1/006* (2013.01); *C02F 3/006* (2013.01); *C02F 3/223* (2013.01)

(58) Field of Classification Search
CPC ........... C02F 1/006; C02F 3/006; C02F 3/223
See application file for complete search history.

(56) References Cited

U.S. PATENT DOCUMENTS

| | | | | |
|---|---|---|---|---|
| 4,828,625 A | * | 5/1989 | Moran | B08B 9/0933 134/168 R |
| 5,458,788 A | | 10/1995 | Tang | |
| 5,951,878 A | * | 9/1999 | Astrom | B01D 33/21 210/197 |
| 6,273,402 B1 | | 8/2001 | Cheng | |
| 2004/0124158 A1 | | 7/2004 | Smith | |
| 2008/0023039 A1 | | 1/2008 | Hancock | |
| 2012/0091065 A1 | * | 4/2012 | Xia | B01D 29/39 210/702 |
| 2016/0304378 A1 | * | 10/2016 | Wright | B01D 21/2444 |

FOREIGN PATENT DOCUMENTS

CN 105753247 A * 7/2016

OTHER PUBLICATIONS

International Search Report and Written Opinion dated Jul. 17, 2019 in corresponding PCT Application No. PCT/US19/33216.
Aqua-Aerobic Systems, Inc., Cloth Media Filtration brochure, 2016, p. 4, Loves Park, IL, US.
Aqua-Aerobic Systems, Inc., AquaPrime Cloth Media Filter brochure, 2016, Loves Park, IL, US.

* cited by examiner

*Primary Examiner* — Waqaas Ali
(74) *Attorney, Agent, or Firm* — Vitale, Vickrey, Niro, Solon & Gasey LLP

(57) ABSTRACT

A method and apparatus for conditioning the settled solids in the bottom of a wastewater filtration tank to reduce the acidification of the sludge and prevent the excessive growth of undesirable biological growth.

4 Claims, 9 Drawing Sheets

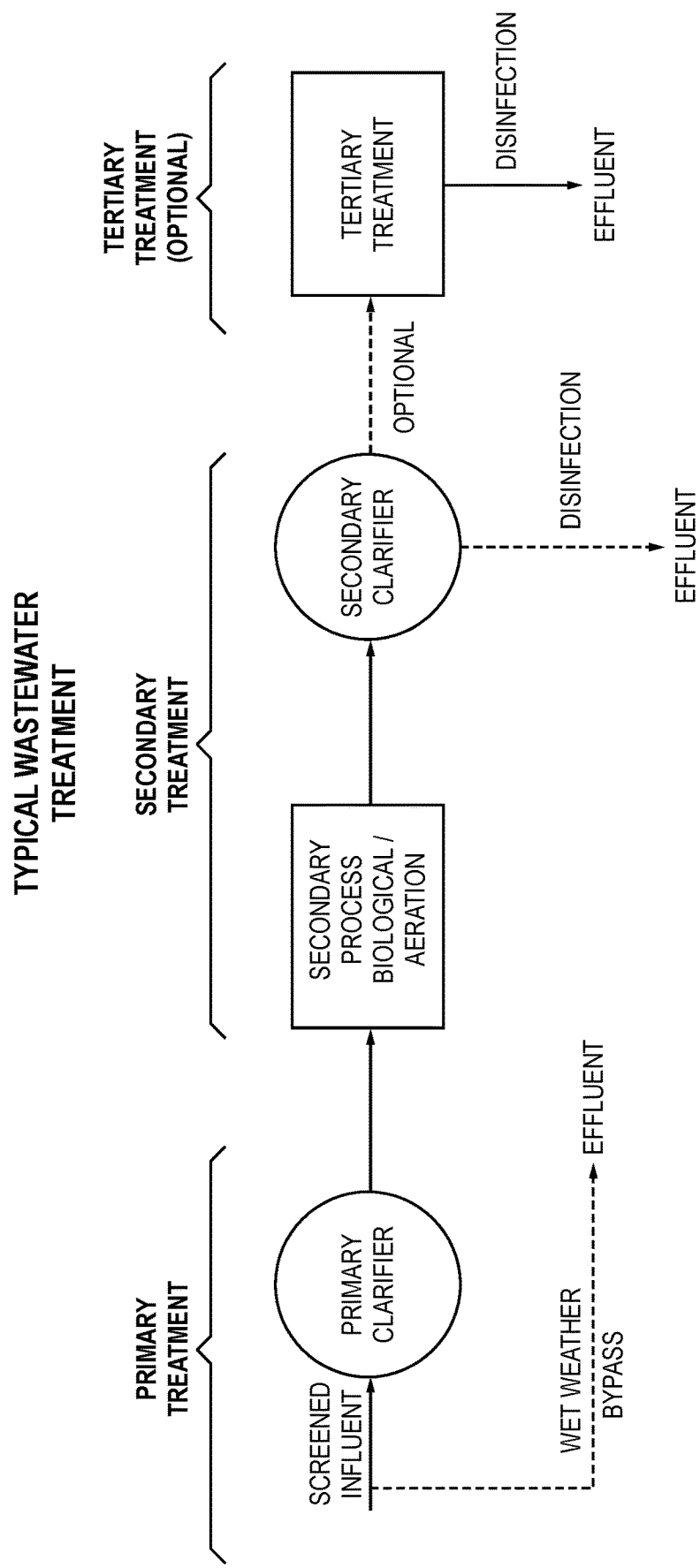

CLOTH MEDIA FILTRATION USED FOR PRIMARY WASTEWATER TREATMENT

CLOTH MEDIA FILTRATION FOR WET WEATHER CONDITIONS

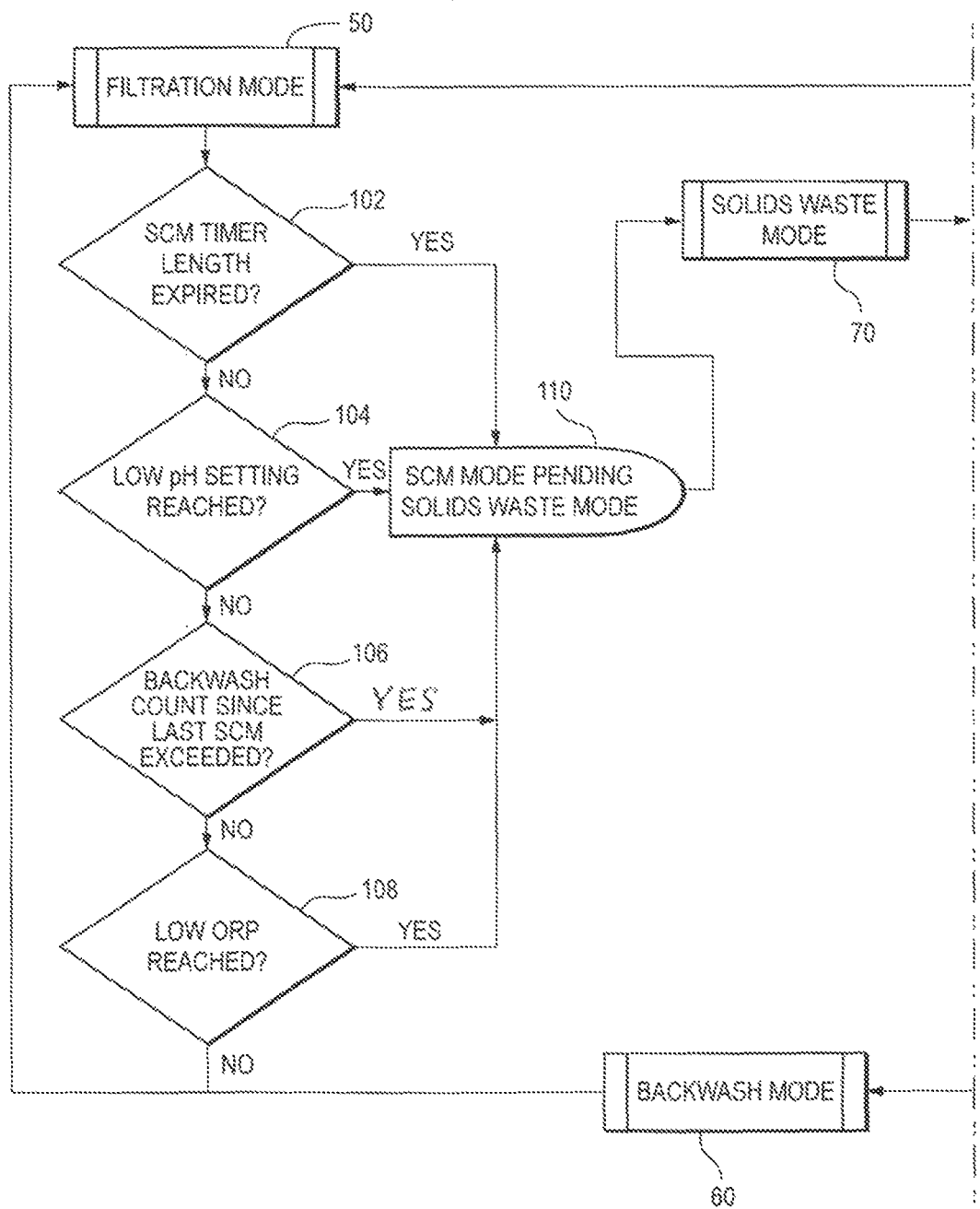

SYSTEM AND METHOD OF SOLIDS CONDITIONING IN A FILTRATION SYSTEM

FIELD OF THE INVENTION

The present inventions relate to the use of cloth media filtration in the primary filtration stage of wastewater treatment. More particularly, the present inventions relate to systems and methods for the conditioning of solids in a cloth media filtration device used for primary or wet weather wastewater treatment.

BACKGROUND OF THE INVENTION

A flow chart of a typical wastewater treatment process is shown in FIG. 1A. Included in the process is primary treatment, secondary treatment and optional tertiary treatment. Primary treatment consists of screening or pretreating the influent of wastewater and sending it to a primary clarifier. The primary clarifier removes the large solids from the wastewater by settling and skims off fats and oils that float to the top.

The effluent from the primary clarifier is transferred to the secondary treatment process that includes further treatment using biological means and a secondary clarifier. In some systems, the water is disinfected and then discharged. In other systems, a tertiary treatment step is added before disinfection and discharge. A popular device used in tertiary filtration is cloth media filtration. An example of a preferred cloth media filtration system is known as the AquaDisk® system, which is manufactured and sold by the assignee of this patent, Aqua-Aerobic Systems, Inc. of Rockford, Ill. A variety of typical primary, secondary and tertiary waste water treatment systems are well known to those of skill in the art.

Clarifiers, because of the nature of their operation, require very large tanks or basins which take up a relatively large amount of space at a wastewater treatment facility. In addition, and particularly at older plants, the primary clarifier can become overloaded in storms or other high flow or wet weather conditions. In such situations, older plants would bypass the primary clarifier and simply discharge the untreated overflow to rivers and the like. This is referred to as a wet weather bypass in FIG. 1A. For obvious reasons, this is unacceptable.

To solve the space and overflow issues, Aqua-Aerobic Systems pioneered the use of cloth media filtration, typically used in tertiary treatment applications, for use in the primary treatment phase of wastewater treatment. As shown schematically in FIG. 1B, a cloth media filtration device is used to replace the standard primary clarifier (see FIG. 1A). A preferred example of a cloth media filtration system used in primary treatment to replace the primary clarifier is known as the AquaPrime® system, which is manufactured and sold by the assignee of this patent, Aqua-Aerobic Systems Inc. of Rockford, Ill. This system, when used in primary filtration, saves space at the plant and has a higher and faster rate of solids removal than a typical primary clarifier. In fact, it has been determined that a cloth media filtration device used for primary filtration will require only 10%-15% of the space required by a conventional primary clarifier. In addition, because of its high solids removal, substantial energy and operational savings are achieved by the use of cloth media filtration for primary treatment of wastewater.

In addition, and as set forth schematically in FIG. 1C, the preferred AquaPrime® system may also be used as a tertiary filtration system (in place of, for example, the AquaDisk® system) and as a wet weather back up primary treatment system. In those situations, the preferred cloth media filtration system for tertiary treatment is the AquaPrime® system. In periods of high flow and/or storm conditions, influent may be all or partially diverted to the AquaPrime® cloth media filtration system and then back to the primary clarifier.

The use of cloth media filtration for primary and wet weather wastewater treatment revealed certain unique problems. For example, as the sludge builds-up as a result of excess detention time in the sludge hopper at the bottom of the cloth media filtration tank, the sludge can become anaerobic. This can result in the acidification (fermentation) of the sludge that can reduce the pH in the lower portion or sludge hopper of the filtration tank. This, in turn, can lead to the development of undesirable bacteria and other organisms like fungi. If not controlled, the undesirable biological growth can interfere with the normal operation of the cloth filtration media and overall performance of the system. Such organisms can also be difficult to remove once established. In addition, the solids which contain grit, debris and other organics are prone to compaction and can make removal and/or collection for use in other processes difficult. And, while excess sludge may be removed from the sludge hopper by a solids collection manifold, it is necessary to interrupt filtration to do so. That is undesirable.

Further, microbial induced corrosion is another example of undesirable biological growth caused by prolonged anaerobic activity in filtration systems. Sulfate reducing bacteria can produce localized, strong acids which can degrade concrete and steel tank structures. That is also undesirable.

The present inventions solve these and other problems associated with the use of cloth media filtration in the primary treatment of wastewater as well as for wet weather conditions. For example, the present inventions provide for apparatus and methods to mix (or condition) the sludge (solids) at the bottom of the filtration tank, typically using bulk liquid and/or incoming flow which can neutralize the pH (i.e., increase the pH) of the sludge and the overall tank to prevent the growth and/or build-up of fungus and undesirable bacteria. The present inventions may also distribute oxygen throughout the tank to prevent prolonged anaerobic activity from corroding the tank's surface or concrete. In addition, the conditioning of the solids at the bottom of the tank can prevent excessive compaction and improve solids removal by the solids collection manifold. The present inventions also reduce the frequency of sludge removal and take up a smaller footprint at a wastewater treatment plant.

SUMMARY OF THE INVENTION

The present inventions preserve the advantages of known cloth media filtration systems and methods and also provide new features and advantages, particularly for cloth media filtration use for primary wastewater treatment.

Therefore, it is an object of the present inventions to provide a solids conditioning apparatus and method for use with cloth media filtration in primary wastewater treatment.

Another object of the present inventions is to neutralize (or raise) the pH of the contents of a cloth filter media filtration tank used for primary filtration by periodically conditioning the sludge.

An additional object of the present inventions is to provide a method and system to control the conditioning, build-up and compaction of solids in the cloth media filtration tank.

A further object of the present inventions is to mix or loosen the settled solids to aid in solids removal.

Still another object of the present inventions is to provide a method and apparatus for solids conditioning that help eliminate the growth or build-up of undesirable biological growth in the cloth media filtration device used in primary wastewater treatment and to reduce the frequency of solids removal or collection.

Still an additional object of the present inventions is to provide a jet mixing system near the bottom of the cloth filter media tank to conduct solids conditioning, potentially using existing backwash or solids waste equipment (such as valves, pumps and piping).

Still a further object of the present inventions is to provide a method and system that controls the frequency, duration and intensity of solids conditioning in a cloth media filtration used for primary filtration.

Still yet another object of the present inventions is to improve the overall characteristics of the wasted solids by eliminating the preferential withdrawal of liquid due to rat-holing (short circuiting) or sludge blanket filtration thereby improving the efficiency of solids removal.

Still yet a further object of the present invention is to distribute oxygen throughout the tank to prevent microbial induced corrosion caused by anaerobic bacteria biofilm formation at the tank or concrete surfaces.

According to the stated and unstated objects, features and advantages of the present inventions, a system to condition a build-up of settled solids or sludge from a bottom of a wastewater treatment filtration tank is provided. The system includes a sludge hopper on the bottom of the tank for collecting the sludge; a high velocity jet nozzle adjacent to the sludge hopper, the jet nozzle in fluid communication with a solids conditioning valve; and, a pump in fluid communication with the jet nozzle and in fluid communication with a fluid from a fluid source from the tank, wherein the fluid is pumped by the pump through the solids conditioning valve and through the jet nozzle to fluidize the sludge in the sludge hopper by the output of the jet nozzle. The system may also include an embodiment wherein the fluid source is from a sludge collection manifold on the bottom of the sludge hopper, the sludge collection manifold in fluid communication with a solids waste valve and said pump. Alternatively, the fluid source may be from a backwash shoe in the tank, the backwash shoe in fluid communication with a backwash valve and the pump. In a preferred embodiment, the jet nozzle generates a flow velocity greater than fifteen feet per second.

A method of conditioning sludge which has settled in a sludge hopper on a bottom of a cloth medial filtration tank, the tank having a manifold used in the removal of sludge during a sludge wasting mode and having a backwash shoe for conducting a backwash mode is also provided. A preferred embodiment of the method of conditioning sludge includes the steps of sensing a solids conditioning mode triggered event; waiting completion of the sludge wasting mode; initiating a solids conditioning mode upon the sensing of a trigger event and the completion of the sludge wasting mode; selecting a flow source for said solids conditioning mode; conducting said solids conditioning mode using a high velocity nozzle adjacent to the sludge hopper; and, terminating said solids conditioning mode after the lapse of a predetermined amount of time. In one embodiment, the flow source for the solids conditioning mode is from said manifold. In another preferred embodiment, the flow source for the solids conditioning mode is from the backwash shoe. The method provides for a trigger event, one of which is the passage of a predetermined amount of time. Another trigger event is a low pH reading in the sludge. Still another trigger event is the conduct of a predetermined amount of backwash modes. And, finally, a fourth trigger event may be a low ORP reading in the sludge. In another embodiment, the solids conditioning mode may be aborted based upon a sensing of a high water level in the tank signaling the necessity to conduct a backwash mode.

Inventor's Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1A is a flow chart showing a typical wastewater treatment process.

FIG. 3A is the detailed portion of the flow chart labelled 3A in FIG. 3.

DETAILED DESCRIPTION OF PREFERRED EMBODIMENTS

Figure 1B:
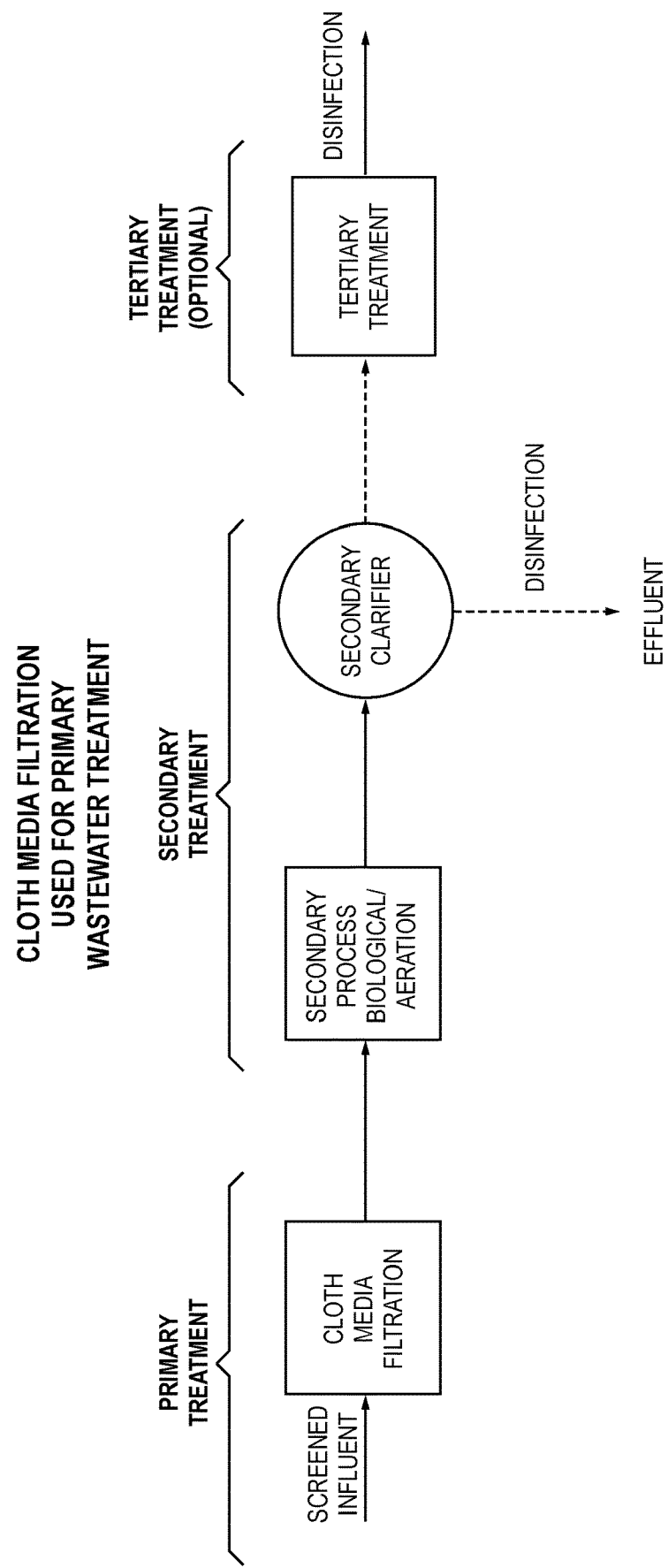
FIG. 1B is a flow chart showing a typical wastewater treatment process using cloth media filtration as part of the primary treatment process in place of a primary clarifier.
Figure 1C:
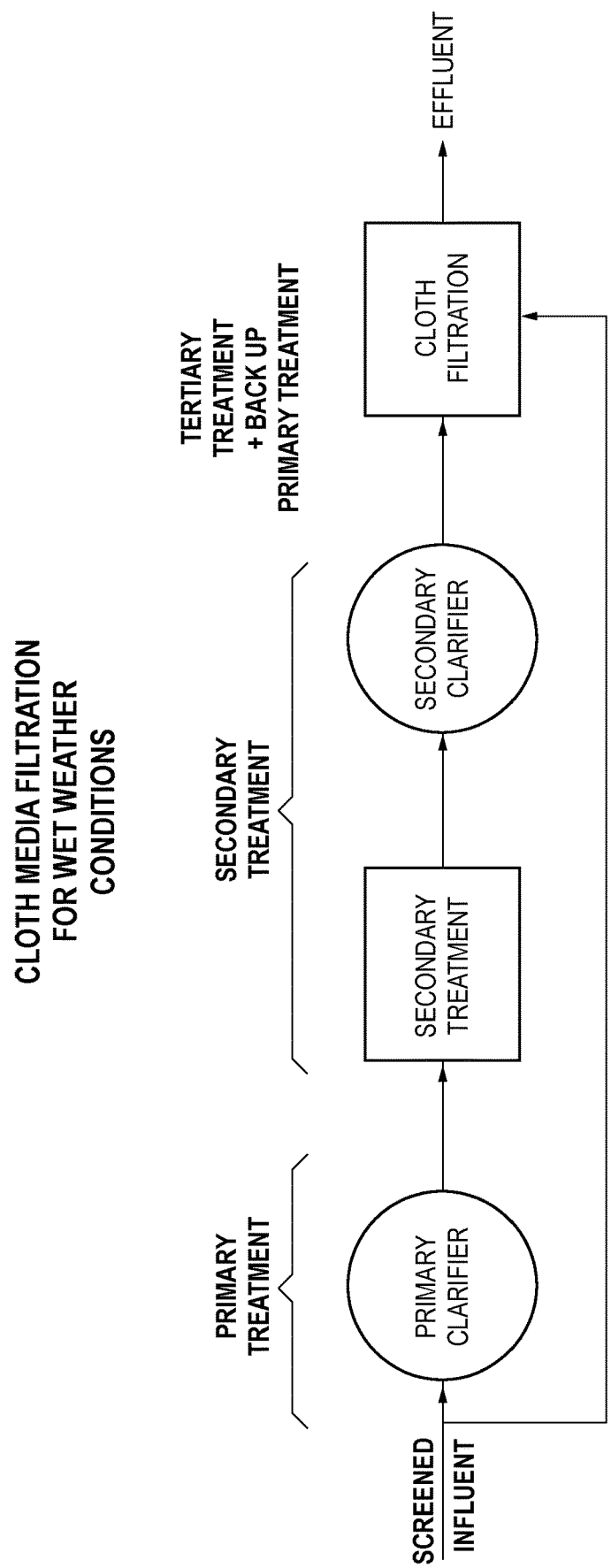
FIG. 1C is a flow chart of a typical wastewater treatment process using cloth media filtration for tertiary treatment as well as for primary treatment in wet flow or overflow conditions.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

As indicated, Aqua-Aerobic Systems, Inc. pioneered the use of cloth media filtration in the primary treatment of wastewater. A preferred embodiment of such a system is known as the AquaPrime® system. A schematic representation of the principal components of the AquaPrime® primary cloth media filtration device is shown schematically as 10 in FIG. 1D. Cloth media filtration system 10 includes a tank 11. It will be understood by those of skill in the art that tank 10 may be constructed with steel or may take the form of a traditional concrete basin.

Tank 11 includes a bottom portion 12 and a top portion 13. The top portion 13 includes an inlet (not shown) and an overflow 14. A scum weir 15, and an associated scum line 16 and scum valve 17 are also provided. As will be understood by those of skill in the art, the scum weir 15 is used to remove the fats and oils that float to the top of the tank. Tank 11 typically has a high water level 18 and a low water level 19, the sensing of which may trigger a backwash operation. Filtering is conducted using one or more disk filter members 20 that are in fluid communication with a hollow center tube 20a that discharges the filtered influent for further processing as will be understood by those of skill in the art. This aspect is commonly referred to as the filtration mode 50 (see FIG. 3A).

The cloth media filtration material is periodically cleaned by backwashing using suction. A typical cloth media filtration backwash system includes a backwash shoe 21 in communication with a backwash line 22 having a backwash valve 23 and an associated pump 24. A discharge line 25 is provided. An associated discharge valve 26 may also be provided for filtration, but is required for the solids conditioning mode of the present inventions as hereinafter described. The filtering and backwash operation are understood by those of skill in the art and may be conducted based upon the passage of time or the sensing of a high water level. The backwashing is commonly known as backwash mode 60 (see FIG. 3A). Reference may also be made to the AquaDisk® (tertiary cloth media filtration) and/or AquaPrime® (primary cloth media filtration), both by Aqua-Aerobic Systems, Inc. The cloth media filtration typically has a plurality of disk filter members 20. In the preferred embodiment, each pair of disk filter members has associated backwash shoes 21, backwash line 22, backwash valves 23 and pumps 24.

In a primary treatment configuration, the bottom portion 12 of tank 11 includes sloped walls 27 forming a sludge hopper 32 into which the sludge 30 and other particulates settle during the filtration process. A sludge collection manifold 28, a solids waste line 29 and a solids waste valve 31 are also provided, all of which may be controlled by a controller 39 (FIG. 2A). As sludge 30 accumulates during the filtration process, the sludge hopper 32 is periodically emptied of sludge 30 through sludge collection manifold 28, as will be understood by those of skill in the art. This aspect is referred to as the solids waste mode 70, i.e., when the settled solids are removed from the system (FIG. 3B). Pump 24 (or a plurality of pumps) acts as a pump for backwashing in the backwashing mode 60 as well as a pump for solids waste mode 70. And, as discussed below, it is also used for solids conditioning mode 100.

Figure 1D:
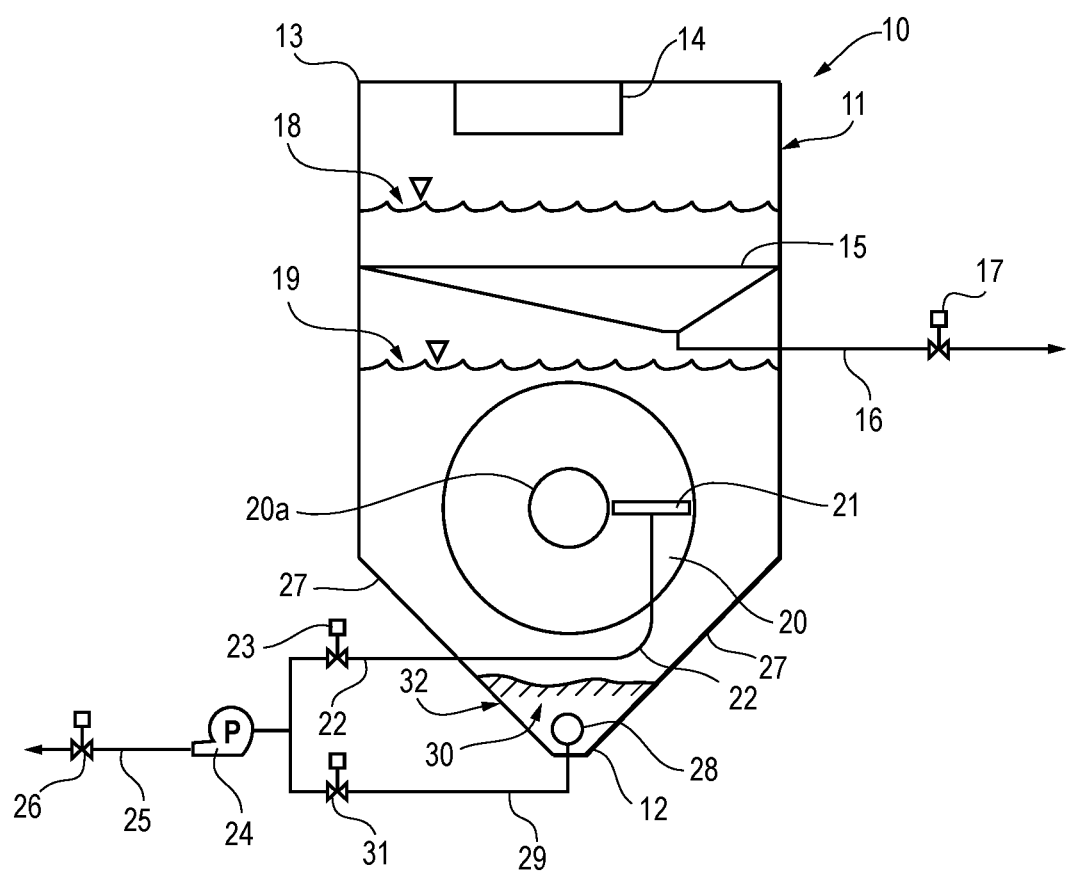
FIG. 1D is a cross-sectional schematic side view of the principal components of a preferred cloth media filtration system configured for use in the primary treatment of wastewater and in overflow or wet weather conditions.
Figure 2:
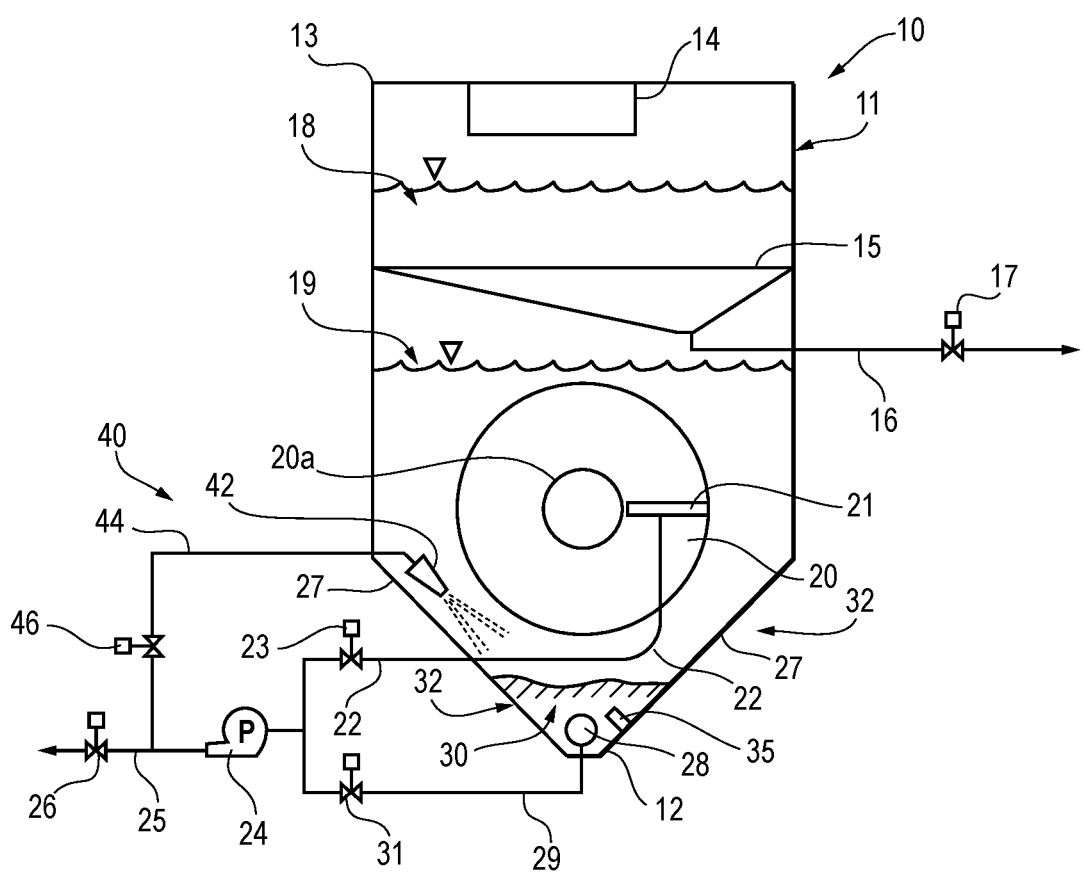
FIG. 2 is a cross-sectional schematic side view of a preferred embodiment of the present invention having solids conditioning equipment capable of practicing a preferred method of the present invention shown in conjunction with the preferred cloth media filtration system.
Figure 2A:
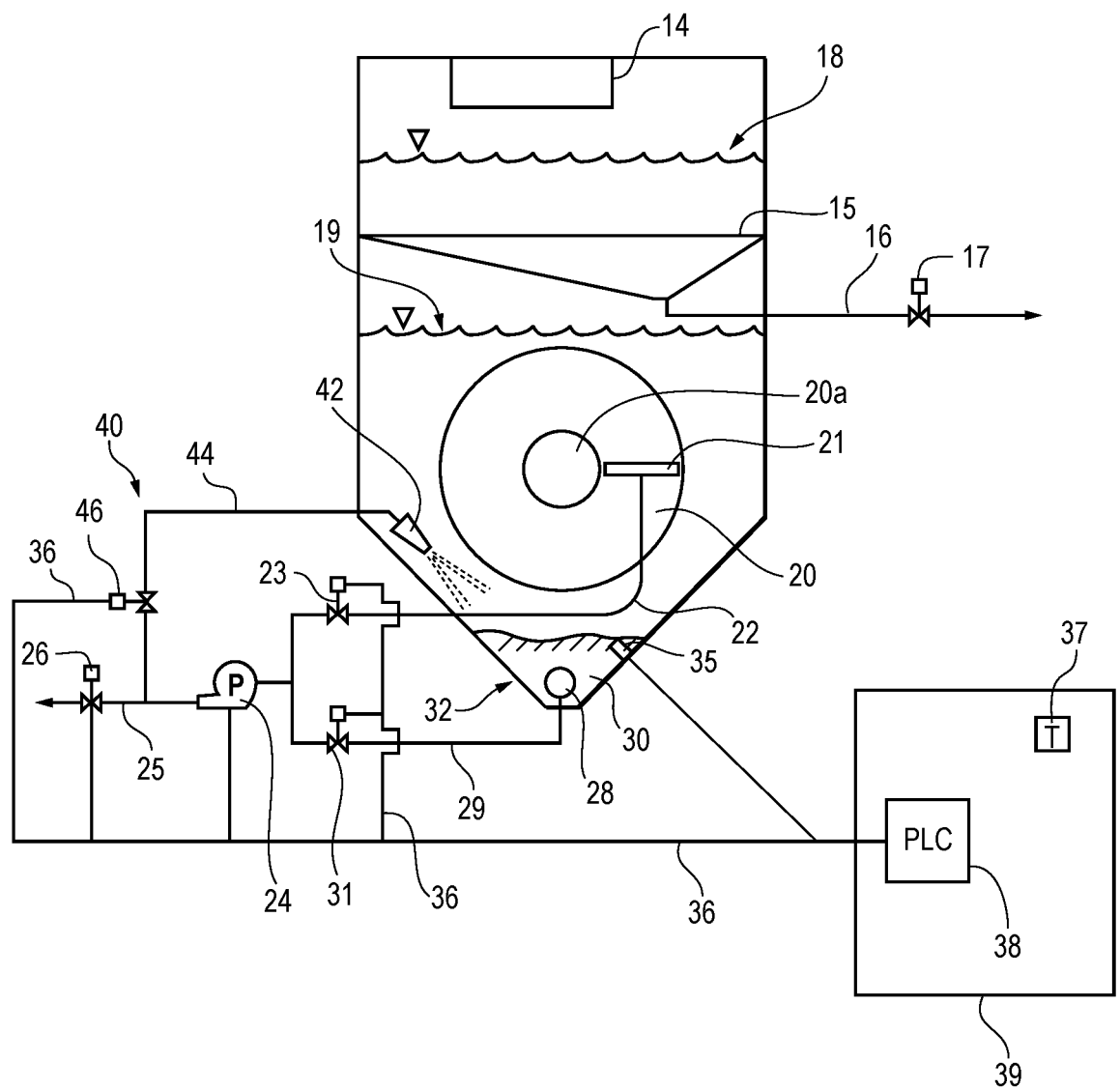
FIG. 2A is a cross-sectional schematic side view of a preferred embodiment of the present invention showing the representative valves, pump and probes connected to a PLC for control of the system, including the solids conditioning mode.

A preferred embodiment of the solids conditioning system 40 of the present invention may be seen by reference to FIGS. 2 and 2A. The method of solids conditioning as described herein, with reference to the preferred embodiment, is referred to as the solids conditioning mode or SCM. The present inventions are described in conjunction with and when added to a preferred primary cloth media filtration system, i.e., the AquaPrime® system, as schematically shown in FIG. 1D. It will be understood by those of skill in the art that the solids conditioning systems 40 and methods 100 of the present inventions may be used with other cloth media filtration systems configured for use in primary wastewater treatment. It will also be understood that the present inventions are also applicable to non-primary wastewater treatment operation of a cloth media filtration system.

The preferred solids conditioning system of the present inventions is shown generally as 40 in FIGS. 2 and 2A. The principal components include a high velocity jet nozzle 42, a solids conditioning line 44 and solids conditioning valve 46. Jet nozzle 42 is located in the bottom portion 12 of tank 11 and within or adjacent to sludge hopper 32. Like the backwash components 20, 20a, 21, 22 and 23, there is typically a solids conditioning system 40 associated with each pair of disk filter members 20. This is because, in the preferred embodiment, solids conditioning system 40 preferably may use the backwash or sludge removal components during SCM operation as hereinafter described. This increases flexibility for sludge conditioning and saves costs. It will be understood by those of skill in the art, however, that solids conditioning system 40 may be configured with its own pump 24 and other selected components. In a preferred embodiment, jet nozzle 42 is designed to generate a velocity of at least ten feet per second, and preferably a velocity greater than fifteen feet per second, to adequately induce the desired agitation and fluidization to the settled sludge 30.

One or more probes 35 are situated within sludge hopper 32. In a preferred embodiment, one probe 35 is a pH sensor and one probe 35 is an ORP sensor. As hereinafter described, both sensors are not required and other sensors may be included. Probe 35 is electrically connected 36 to a PLC 38 which is part of a controller 39. Similarly, solids conditioning pump 24, valve 46, discharge valve 26, backwash valve 23 and solid waste valve 31 are also electronically connected 36 to PLC 38. In this manner, the various processes, including solids conditioning mode, may be electronically controlled as hereinafter described. It will be understood by those of skill in the art that the electrical connection 36 to PLC 38 of the various components may be wired, wireless, WiFi and/or Bluetooth and the like.

As shown in FIG. 3A, the filtration mode 50 is the standard or default mode of operation of cloth filter media filtration system 10. As will be understood by those of skill in the art, the filtration mode 50 is the main mode and is in operation approximately 95% of the time. During filtration 50, the cloth filter media gradually becomes clogged with deposited solids. As a result, the fluid level in tank 11 reaches its high water level 18. At this point, a backwash mode or operation 60 is conducted. In addition to the initiating of a backwash mode 60 upon the high water level 18 situation, backwashing mode 60 may occur based upon the passage of time using a timer 37 as part of controller 39. The initiation and operation of the backwash mode 60 is well known to persons of ordinary skill in the art.

Another mode of operation is the solids waste mode 70. As the heavier solids 30 settle in sludge hopper 32, they are removed on a periodic basis. In general, and as will be understood by those of skill in the art, to conduct the solids waste mode 70, solids waste valve 31 and waste discharge or discharge valve 26 are opened. Pump 24 is activated and sludge 30 is removed through sludge collection manifold 28 and discharged via discharge line 25 to waste handling facilities or otherwise disposed of. Like the other modes of operation, solids waste mode 70 may be electronically controlled via controller 39.

During the filtration mode 50, the solids 30 have a tendency to settle and compact. This can lead to poor or incomplete solids removal and can also lead to acidification of the sludge 30 or the growth of undesirable organisms. The solids conditioning mode or SCM 100 of the present invention provides the energy necessary to fluidize the solids or sludge 30 to optimize the solids waste mode 70 and help prevent acidification of sludge 30 and the build-up of undesirable organisms. The SCM 100 is used in conjunction with the solids conditioning system 40.

In a preferred embodiment, SCM 100 may be initiated upon the occurrence of one of four triggered events. Specifically, SCM 100 may be initiated by the lapse of time 102 of an SCM timer 37. In typical plants and operations, this time may be between two to four hours. It will be understood by those of skill in the art that the amount of time before an SCM mode 100 may be based upon the particular plant and loading requirements. As shown in FIG. 3A, if the set length of time is exceeded, the SCM mode 100 is initiated after the next solids waste mode 70 at SCM pending mode 110 as hereinafter described. Again, the sensing of trigger events and operation of valves and the like are preferably controlled by controller 39.

If the time 102 has not been exceeded, SCM mode 100 may be initiated when anaerobic conditions or a low pH is sensed in the sludge 30 by probes 35 located in sludge hopper 32. If the low pH condition 104 is sensed, the system goes into the SCM pending mode 110. A typical low pH setting, as will be understood by those of skill in the art, is when the pH of sludge 30 is less than 6.0 or 6.5. Other set points may be chosen by the plant operator.

A third condition that may be used to trigger a solids condition mode 100 is when the backwash count 106 since the last prior SCM mode 100 was conducted. This is because solids loading (i.e., the deposition of solids 30 in sludge hopper 32) is directly related to the frequency of the backwash operation 60. If the solids level 30 drops, the frequency of backwash 60 is reduced. If the solids level 30 raises, the frequency of backwash operation 60 increases. Thus, in a preferred embodiment, the SCM mode 100 may be triggered by backwash mode 60 frequency. This type of trigger may be desirable in applications which occasionally experience very heavy solids loading, but the system does not include a pH 35 or ORP 35 sensor. As shown in FIG. 3A, if the backwash count 106 has been exceeded, then the system goes into SCM pending mode 110.

A fourth trigger for the initiation of the SCM mode 100 is reaching a low oxygen reduction potential 108 or ORP in sludge 30. The ORP level of sludge 30 is sensed by probes 35 and sent to the controller 39. For example, a low ORP level could be negative 100-200. If the set ORP level is reached, the system goes into SCM pending mode 110.

SCM pending mode 110 is used to delay SCM mode 100 until the most opportune stage. In particular, when one of the four above described triggers, i.e., 102, 104, 106 or 108, occurs, the system waits to conduct the SCM mode 100 until after a solids waste removal mode 70. For example, a solids waste mode occurs every three to four backwash modes 60 (similar to the backwash count trigger discussed above). And, in a typical plant, each filter member 20 is backwashed approximately every ten to fifteen minutes, although it will be understood by those of skill in the art that backwash mode 60 and solids waste mode 70 can occur more or less frequently. Upon completion of the solids waste mode 70, the solids conditioning mode 100 is initiated.

Figure 3:
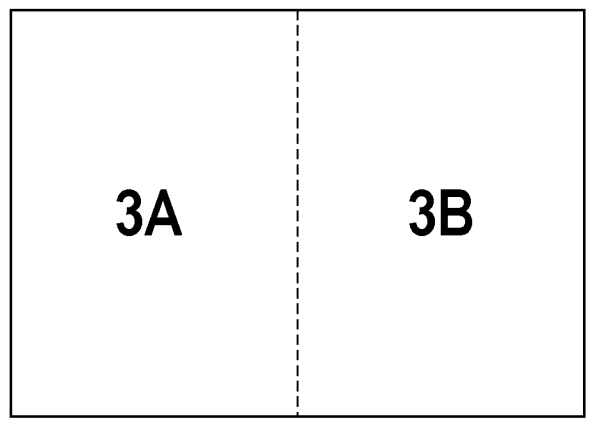
FIG. 3 is a flow chart of a preferred embodiment of the method and system of solids conditioning of the present invention.
Figure 3B:
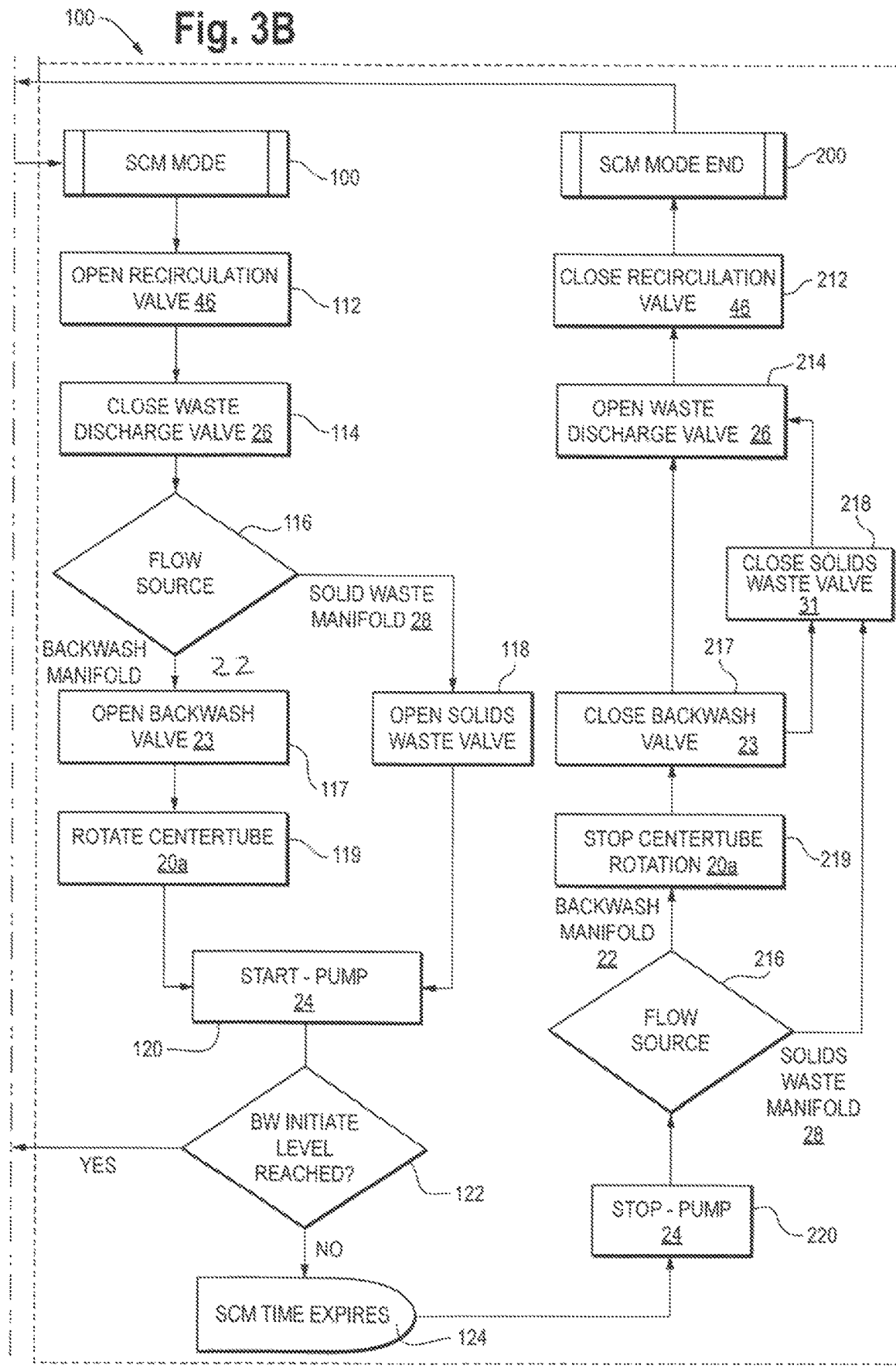
FIG. 3B is the detailed portion of the flow chart labelled 3B in FIG. 3.

The steps and operation of a preferred embodiment of solids conditioning mode 100 are best seen by reference to FIGS. 2, 2A and 3. When conducting the SCM mode 100, solids conditioning valve 46 is opened 112 such that fluid may flow through solids conditioning line 44 and through high velocity jet nozzle 42. Also, the waste discharge valve 26 is closed 114. At this point, and depending upon conditions, the flow source 116 for solids conditioning mode 100 may come from one of two sources. This ability to choose the flow source 116 enhances flexibility of the system. It is possible, but not a normal mode of operation, that both sources may be simultaneously used for the SCM mode 100. For example, if a filter 20 becomes so blocked with solids that it cannot be properly backwashed and the solids conditioning manifold 30 is partially or fully blocked, the operator could use both sources to bring the system back to normal.

In the primary mode of operation, the flow source 116 for the SCM 100 is the solids waste collection manifold 28. Solids waste valve 31 is opened 118. As a result, fluid may be drawn through sludge collection manifold 28 through solids waste line 29 via activation 120 of pump 24 through solids conditioning line 44 and out high velocity jet nozzle 42.

Alternatively, in a preferred embodiment, the primary flow source 116 may come from the backwash line 22. This flow source 116 option is typically selected if there is a high quantity of debris in the system. In this operation, fluid enters backwash valve 23 which is opened 117 and center tube 20a is rotated 119. Fluid then flows through backwash shoe 21 into backwash line 22 through activation of pump 24. This fluid then flows through solids conditioning line 44 and out high velocity jet nozzle 42.

In the preferred embodiment, there is a check 122 to determine if the SCM 100 should be aborted in the situation where there is too much influent flow to the cloth filter media system 10. This occurs when a high water level 18 is reached in tank 10, making it necessary to conduct the backwash mode 60 so the system 10 may perform normally. If no such situation exists, the SCM 100 is completed upon the expiration of the predetermined time 124. As will be understood by those of skill in the art, the SCM 100 time is determined by the operation based upon the condition of the treatment facility and trial and error. An SCM 100 time of one to two minutes is typical.

Upon completion of the SCM 100, pump 24 is stopped 220. Then, depending upon the flow source 216, the appropriate valves are closed. If solids waste manifold 28 was the source of the flow 216, the solids waste valve 31 is closed 218. If the flow source 216 is the backwash line 22, the center tube 209 is stopped 219 and backwash valve 23 is closed. Regardless of the flow source 216, solids conditioning valve 46 is closed 212 and the SCM 100 is ended or completed 200.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present system and method inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A system to condition a build-up of settled solids or sludge from a bottom of a wastewater treatment filtration tank comprising:
    a sludge hopper on the bottom of said tank for collecting said sludge;
    a sludge collection manifold extending along the bottom of the length of the sludge hopper, the sludge collection manifold in fluid communication with a solids waste line, a solids waste valve and a pump;
    a high velocity jet nozzle within the sludge hopper, the jet nozzle in fluid communication with a solids conditioning valve, said solids conditioning valve independent from the solids waste valve;
    a controller having a PLC to control the initiation of the conditioning of the settled solids separate from removal of the settled solids from the system using a solids waste mode;
    said pump in fluid communication with a solids conditioning line and the jet nozzle and in fluid communication with a fluid from a fluid source from said tank, wherein said fluid is pumped by said pump through the solids conditioning valve and through the jet nozzle to fluidize, independent of sludge removal, the sludge in said sludge hopper by the output of the jet nozzle to prevent the build-up of biological growth within the sludge and to introduce oxygen into the sludge; and,
    at least one probe in the sludge hopper, the at least one probe in communication with the PLC of the controller to determine the initiation of the solids conditioning mode.

2. The system of claim 1 wherein said fluid source is from a backwash shoe in said tank, said backwash shoe in fluid communication with a backwash valve and said pump.

3. The system of claim 1 wherein said jet nozzle generates a flow velocity greater than fifteen feet per second.

4. The system of claim 1 wherein the solids conditioning mode using the solids conditioning vale is at least prior to the sludge conditioning mode.

* * * * *